April 26, 1932.  A. CALLSEN  1,855,937
CLUTCH
Filed Feb. 17, 1931  2 Sheets-Sheet 1

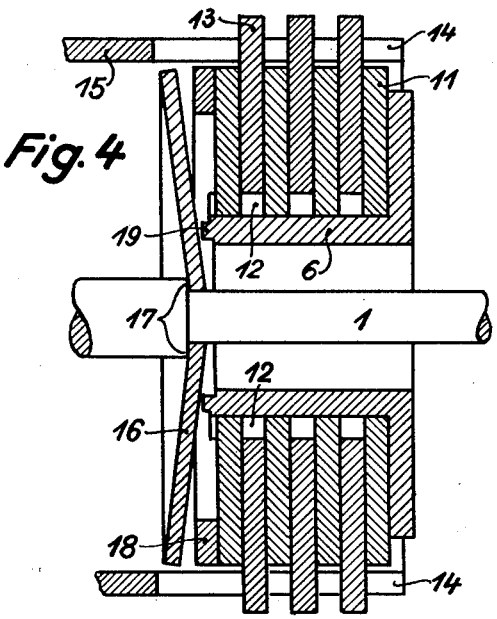
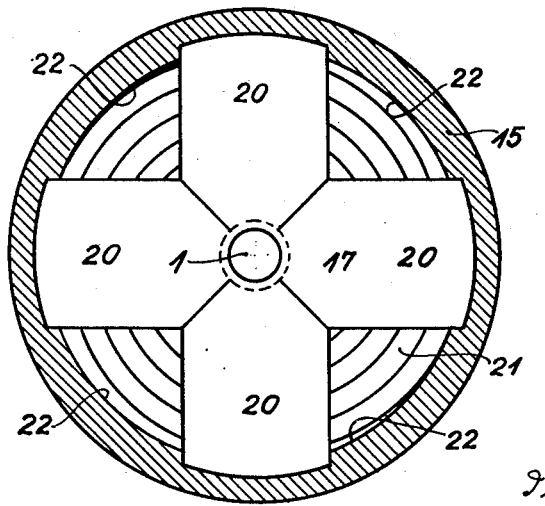

Patented Apr. 26, 1932

1,855,937

UNITED STATES PATENT OFFICE

ALBERT CALLSEN, OF STUTTGART, GERMANY, ASSIGNOR TO ROBERT BOSCH AKTIEN-GESELLSCHAFT, OF STUTTGART, GERMANY

CLUTCH

Application filed February 17, 1931, Serial No. 516,423, and in Germany September 23, 1930.

The present invention relates to clutches and more particularly to a plate clutch which may be suitable for use with electric starters for internal combustion engines and in which the pressing of the plates necessary for the transmission of work is produced by a pressure member displaceable perpendicularly to the plane of the plates in such a way that the pressing corresponds to the moment of rotation to be transmitted. The friction in such couplings increases very quickly with the increasing moment of rotation so that they soon act as rigid clutches and on that account also transmit such loading shocks or moments of rotation which lead to the damaging of a part of the coupling.

The object of the present invention is to overcome this disadvantage and accordingly means are provided whereby the pressure of the plates is reduced after a predetermined path of the pressure member has been exceeded.

The invention is more particularly described with reference to the accompanying drawings in which two forms of construction are illustrated by way of example and in which:—

Figure 3 is a section on a line A—B of Figure 2.

Figure 4 is a diagrammatic representation of the clutch when in the pressure released position.

Figure 1:
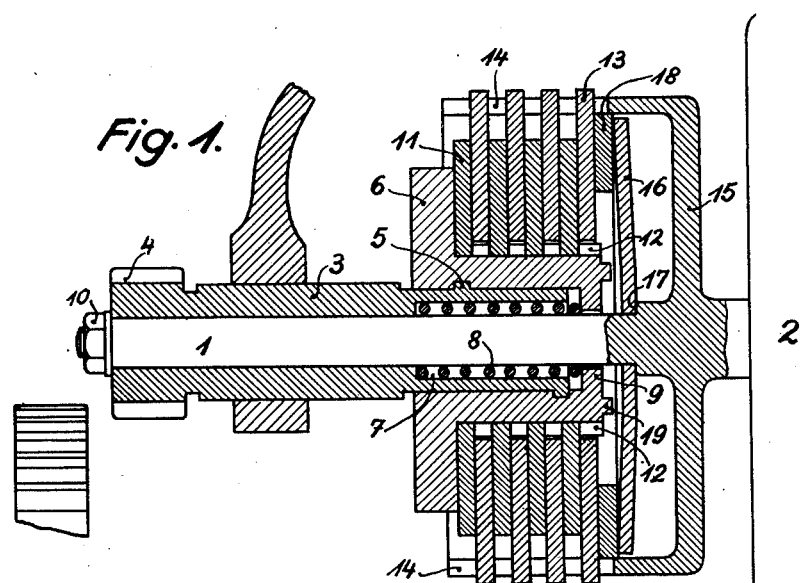
Figure 1 is a section of a pinion drive for an electric starter.

A sleeve 3 is rotatably mounted on the shaft 1 of a starter armature 2. One end of the spindle is formed as a pinion 4. The other end is provided with a high pitched outer thread 5, the pitch of which increases in the direction of rotation of the armature when the armature and the spindle are seen from the side of the pinion. A nut 6 is disposed on the threaded end of the sleeve 3 which is also provided with a bore 7 for the reception of a spring 8 which abuts against a flange 9 of the nut 6.

The axial movement on the shaft 1 of the sleeve 3 at the pinion end is limited by a stop nut 10.

Plates 11 of one part of the clutch are mounted on the nut 6 and are carried by followers 12 of the nut. Plates 13 of the other part of the clutch engage in recesses 14 on the circumference of a bell-shaped part 15, which is rigidly connected to or formed integral with the shaft 1. A resilient disc 16 which abuts at its inner edge against a shoulder 17 of the shaft 1 is mounted on this shaft 1, whilst at the outer edge of such disc 16 a pressure ring 18 is inserted between it and the end clutch plate 13. The radial end of the nut 6 which faces the resilient disc is provided with several nose-pieces which are located at a short distance from the spring disc when the nut 6 is in the slackened position.

The method of operation of the laminated disc clutch is as follows:

When the shaft 1 of the armature is in the position of rest the spring 8 lightly presses the coupling plates 11, 13 together in known manner, so that the pinion is carried along by the clutch before coming into engagement. As soon as the pinion is put into engagement the nut 6, carried along by the coupling plates, is screwed in a direction towards the resilient disc 16 and presses the plates 11 and 13 firmly together so that these can transmit the rotational moment necessary for starting the combustion engine. If, however, the pressure of the pressure or packing member 18 exceeds the normal degree through unforeseen overloading for example, retarded ignition of the motor, the resilient disc 16 yields further due to the displacement towards it of the nose-pieces 19 which bear against the disc. The pressing of the disc 16 by the nose pieces 19 is sustained in such a way that the supporting point of the plates is moved by a greater distance than the displacement of the disc 16 at that part lying opposite to the nose-pieces 19 of the nut 6. As a result when the pressing or packing member is moved along further the pressure in the laminæ is not increased but is reduced.

Figure 2:
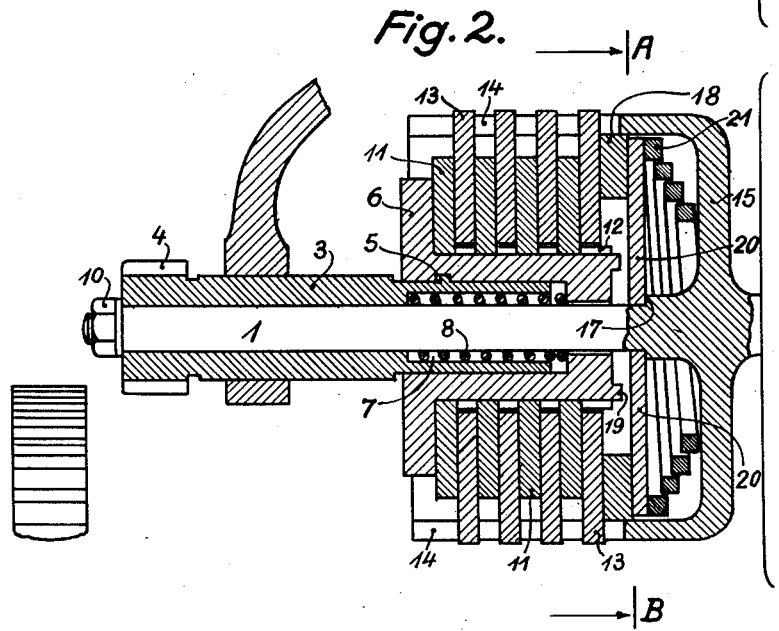
Figure 2 shows a modified form of construction also in section.

Instead of the resilient disc illustrated in Figure 1, the construction according to Figures 2 and 3 provided several stop-plates 20 which are rotatable about the shoulder 17, and are pressed against the flange of the bell-shaped part 15 by a strong spring 21. The plates are held in their radial position by projections 22 of the bell 15. In this arrangement, it is more easily possible to adjust the tension of the spring necessary for the transmission of the moment.

In Figure 4 the clutch is shown in that position in which the pressing of the plates is completely eliminated. For the sake of clearness the bending of the resilient disc is shown very much exaggerated.

It is evident that in the construction according to Figure 1 several leaf springs may be used instead of a spring disc whilst leaf springs may also be used in the modified form instead of the helical springs. Also, it is immaterial with regard to the scope of the invention whether the pressing member is a nut which is axially displaceable by a thread; for example it may be a member which is moved by any other mechanism dependently of the moment of rotation.

I claim:

1. A clutch comprising a driving member, plates on said driving member, a driven member, plates on said driven member, means normally tending to maintain said plates in driving engagement, means to displace one of said members whilst maintaining said plates in driving engagement and means on displacement of said member against said first mentioned means beyond a predetermined amount to relieve the driving engagement between said plates.

2. A clutch comprising a driving member, plates on said driving member, a driven member, plates on said driven member, spring means normally tending to maintain said plates in driving engagement, means to displace one of said members whilst maintaining said plates in driving engagement and means on displacement of said member against said spring means beyond a predetermined amount to relieve the driving engagement between said plates.

3. A clutch comprising a bell shaped driving member, a shaft coaxial and connected thereto, plates carried by said bell shaped member, a sleeve mounted loosely on said shaft, a member on said sleeve displaceable thereon with the rotation of said sleeve, plates carried by said member, spring means maintaining said plates in driving engagement and means for displacing said spring means to release said plates from interengaging driving relationship when the displacement of said member reaches a predetermined amount.

4. A clutch comprising a bell shaped driving member, a shaft coaxial and connected thereto, plates carried by said bell shaped member, a sleeve mounted loosely on said shaft, a member on said sleeve displaceable thereon with the rotation of said sleeve, plates carried by said member, spring means maintaining said plates in driving engagement and abutments on said member for displacing said spring means to release said plates from interengaging driving relationship when the displacement of said member reaches a predetermined amount.

5. A clutch comprising a bell shaped driving member, a shaft coaxial and connected thereto, plates carried by said bell shaped member, a sleeve mounted loosely on said shaft, a member on said sleeve displaceable thereon with the rotation of said sleeve, plates carried by said member, spring means disposed radially above said shaft for maintaining said plates in driving engagement, and abutment means on said member adapted to contact with said spring means intermediate the inner and outer peripheries thereof to displace said spring means and release said plates from interengaging driving relationship when the displacement of said member reaches a predetermined amount.

6. A clutch comprising a bell shaped driving member, a shaft coaxial and connected thereto, plates carried by said bell shaped member, a sleeve mounted loosely on said shaft and having a quick thread thereon at one end, a nut mounted on the threaded end of said sleeve, plates carried by said nut, spring means disposed radially about said shaft for maintaining said plates in driving engagement with the plates of said driving member, and abutment means on said nut adapted to contact with said spring means intermediate the inner and outer peripheries thereof to displace said spring means and release said plates from interengaging driving relationship when the displacement of said nut reaches a predetermined amount.

7. A clutch comprising a bell shaped driving member, a shaft coaxial and connected thereto, plates carried by said bell shaped member, a sleeve mounted loosely on said shaft and having a quick thread thereon at one end, a nut mounted on the threaded end of said sleeve, plates carried by said nut, an annular resilient disc disposed about said shaft for maintaining said plates in driving engagement with the plates of said driving member, and abutment means on said nut adapted to contact with said annular disc intermediate the inner and outer peripheries thereof to displace said annular disc and release said plates from interengaging driving relationship when the displacement of said nut reaches a predetermined amount.

8. A clutch comprising a bell shaped driving member, a shaft coaxial and connected thereto, plates carried by said bell shaped member, a sleeve mounted loosely on said shaft and having a quick thread thereon at one end, a nut mounted on the threaded end of said sleeve, plates carried by said nut, a disc on said shaft, a spring tending to force said disc towards said plates for maintaining said plates in driving engagement with the plates of said driving member, and abutment means on said nut adapted to contact with said disc intermediate the inner and outer peripheries thereof to displace said disc against said spring and release said plates from interengaging driving relationship when the displacement of said nut reaches a predetermined amount.

9. A clutch comprising a bell shaped driving member, a shaft coaxial and connected thereto, plates carried by said bell shaped member, a sleeve mounted loosely on said shaft and having a quick thread thereon at one end, a nut mounted on the threaded end of said sleeve, plates carried by said nut, a disc on said shaft, a helical spring tending to force said disc towards said plates for maintaining said plates in driving engagement with the plates of said driving member, and abutment means on said nut adapted to contact with said disc intermediate the inner and outer peripheries thereof to displace said disc against said helical spring and release said plates from interengaging driving relationship when the displacement of said nut reaches a predetermined amount.

In testimony whereof I have hereunto affixed my signature.

ALBERT CALLSEN.